(No Model.) 2 Sheets—Sheet 1.

D. McCOIG.
TWINE OILER FOR SELF BINDING REAPERS.

No. 391,909. Patented Oct. 30, 1888.

WITNESSES:

INVENTOR.
D. McCoig,
BY Munn & Co.
ATTORNEY.

(No Model.) 2 Sheets—Sheet 2.

D. McCOIG.
TWINE OILER FOR SELF BINDING REAPERS.

No. 391,909. Patented Oct. 30, 1888.

WITNESSES:

INVENTOR,
D. McCoig.
BY Munn & Co
ATTORNEY.

UNITED STATES PATENT OFFICE.

DONALD McCOIG, OF MULL, ONTARIO, CANADA.

TWINE-OILER FOR SELF-BINDING REAPERS.

SPECIFICATION forming part of Letters Patent No. 391,909, dated October 30, 1888.

Application filed April 19, 1888. Serial No. 271,151. (No model.)

*To all whom it may concern:*

Be it known that I, DONALD McCOIG, of Mull, in the county of Kent, Province of Ontario, and Dominion of Canada, have invented a new and Improved Twine-Oiler for Self-Binding Reapers, of which the following is a full, clear, and exact description.

The object of my invention is to provide means to be attached to self-binding reapers whereby the twine used for binding the sheaves may be oiled or coated with some substance to prevent insects and mice from eating the twine and severing the bands. The oiler is to be attached to the reaper in such a position that the twine may pass through it while passing from the twine-box to the needle.

Reference is to be had to the accompanying drawings, forming a part of this specification, in which similar letters of reference indicate corresponding parts in both figures.

Figure 1:
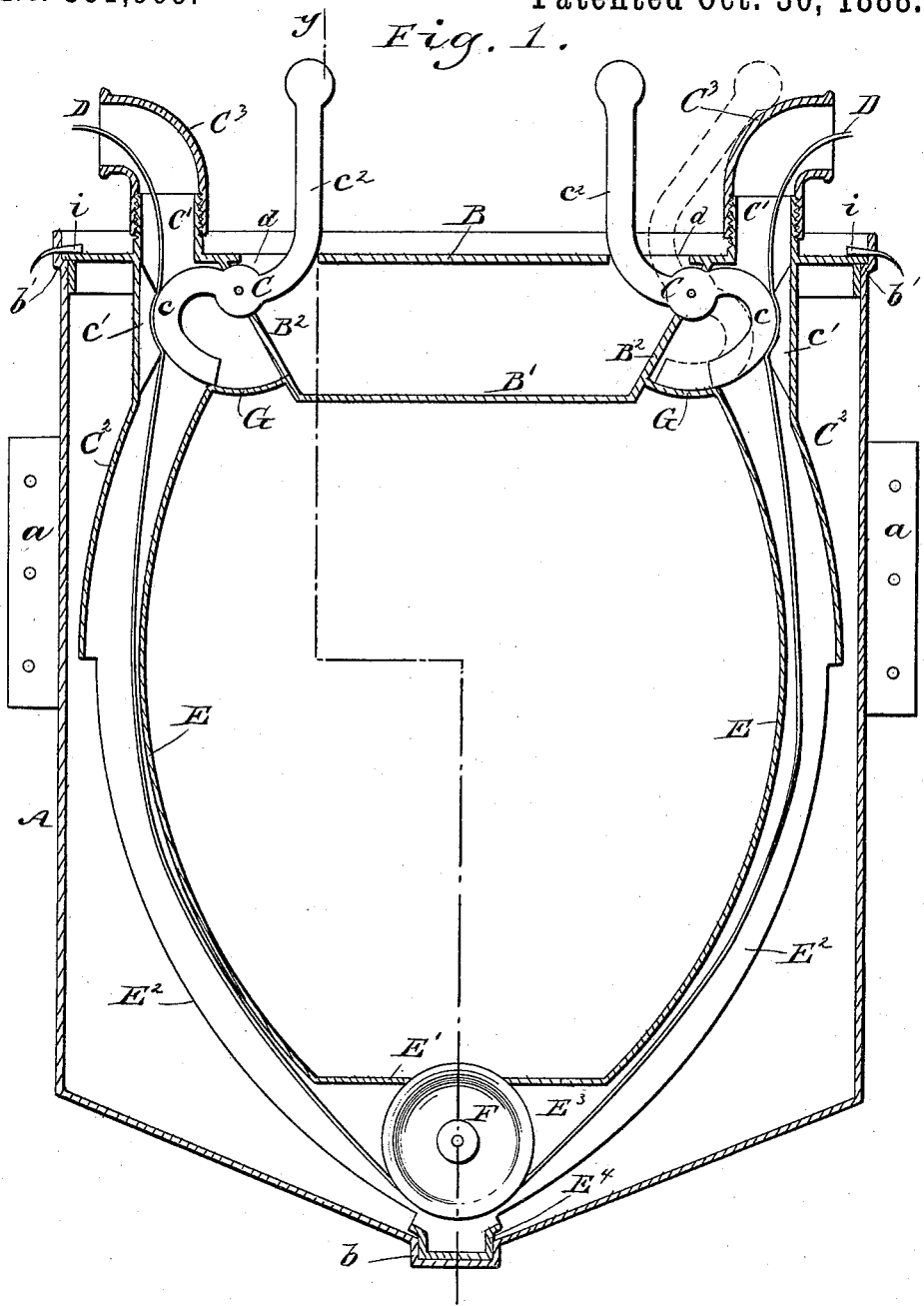
Figure 2:
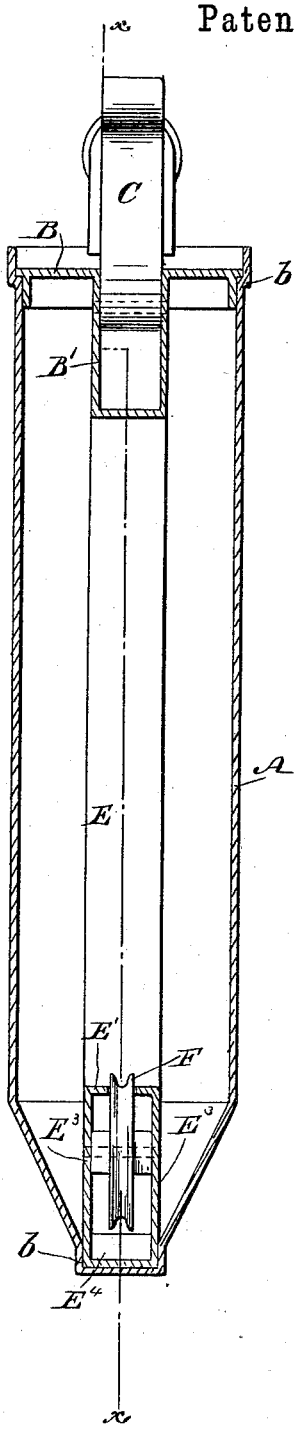

Figure 1 is a sectional elevation of my invention, taken on the line $x\,x$ of Fig. 2; and Fig. 2 is a transverse sectional elevation taken on the line $y\,y$ of Fig. 1.

A represents a main box or casing provided with flanges $a\,a$ for attachment to the reaper. The oil or other substance with which the twine is to be coated is to be supplied to this box or casing A, which is formed with an offset or depression, $b$, at the bottom and with a shoulder, $b'$, at the top, upon which the cover B rests.

To the under surface of the cover B is secured the narrow box B', in the end walls, B², of which the tension-levers C C are pivoted. These tension levers are bent to form the curves $c$, which press against the concaved blocks $c'$, secured to the walls C², for pressing the twine D, first, to keep it taut in passing through the oiler, and, secondly, to remove the superfluous oil as it emerges from the oiler. The said tension-levers are extended upward to form the arms $c^2$, which project up through the openings $d$ in the top of the cover B, and which act as counter-weights to the lower curved portions, $c$, to hold them in contact with the twine. The walls C² C² are made in extension of the short tubes C' C' at each end of the cover B, and together with the curved walls E form short passages or tubes for the twine D. To the upper ends of the tubes C' are secured the bent thimbles C³, which act as guides to the twine D.

The curved walls E constitute a "guide-frame" to hold the twine down into the casing A and substance contained therein, and are attached to the cover to be removed therewith, and they are united at their lower ends by the plate E'. At the edges of the walls E are the parallel flanges E² E², which form a channel to prevent displacement of the twine. These flanges are of considerable width at the bottom, as shown at E³, and between them is journaled the grooved pulley F, under which the twine passes, and which obviates friction. The lower points of the lower portions of the flanges E² E³ are united by the strip E⁴, which fits in the depression $b$ to prevent lateral displacement of cover and guide-frame. The upper ends of the curved walls E are united to the end walls, B², by curved seats G for the tension-levers C when opened, as shown in dotted lines at the right in Fig. 1, for filling the tank A with liquid through the tube C'.

For threading the twine through the oiler the cover and all parts connected therewith are to be removed and the twine passed through the tube at one side, passed under the pulley F, and out at the other side. Then the cover is to be placed in the casing A and secured by the keys $i\,i$, or by other suitable fastenings.

Having thus described my invention, what I claim as new, and desire to secure by Letters Patent, is—

1. The combination, with the cover B, of the curved plates E, flanges E², and step E⁴, and the main casing A, formed with the depression $b$, substantially as described.

2. The cover B, having the chamber B', walls C², curved walls E, flanges E², and tension-levers C, in combination with the pulley F, curved seats G, and concaved blocks $c'$, substantially as described.

DONALD McCOIG.

Witnesses:
W. G. RICHARDS,
WALTER A. THRASHER.